Patented Apr. 28, 1931

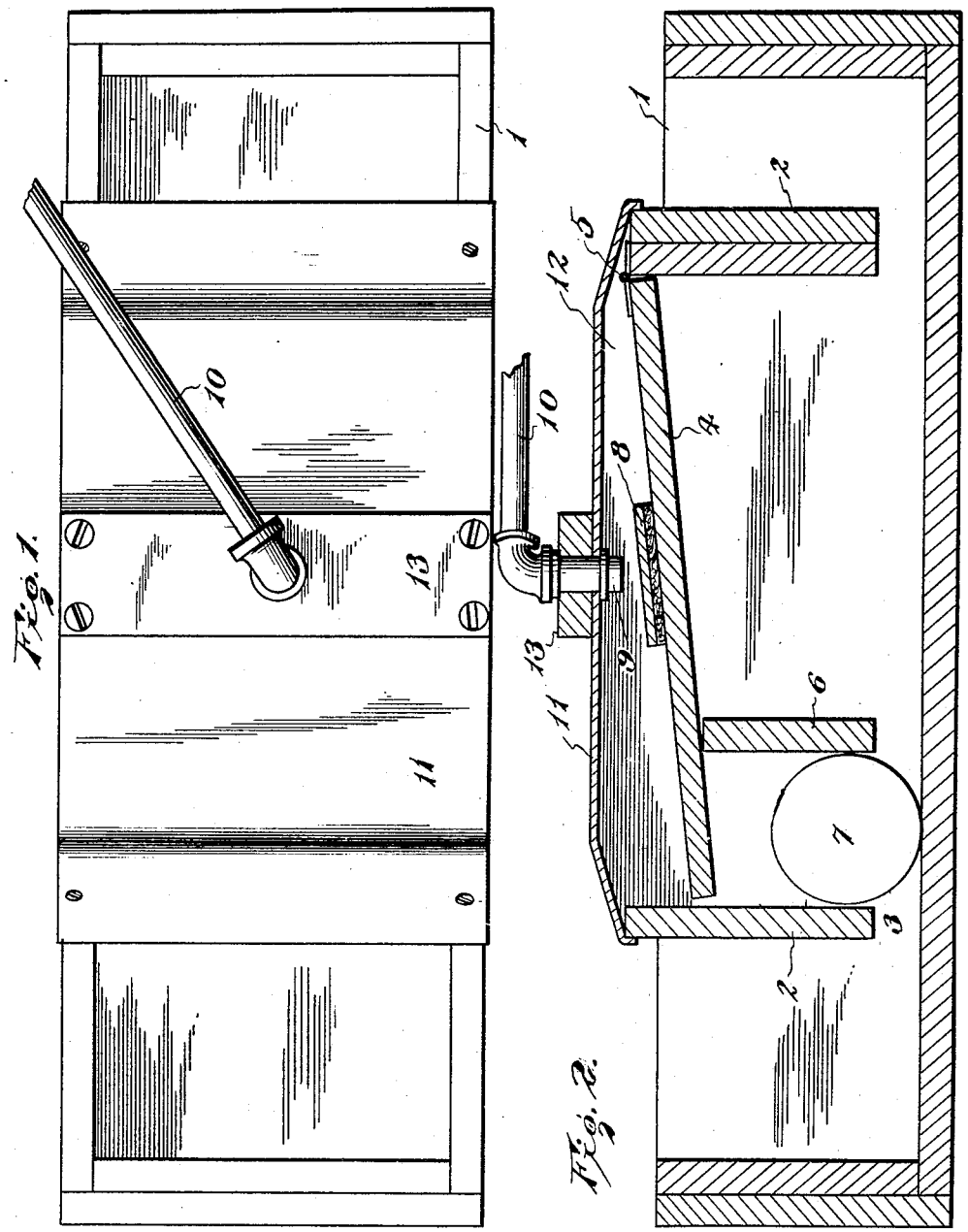

1,802,432

UNITED STATES PATENT OFFICE

CORNELIUS KRAAYENBRINK, OF MADISON, SOUTH DAKOTA

STOCK-WATERING TROUGH

Application filed July 23, 1929. Serial No. 380,384.

This invention is a device for supplying water to live stock, such as poultry and hogs, and the object is to provide an inexpensive structure in which the flow of water will be automatically controlled so as to be maintained substantially at a uniform level. The invention provides a structure for the stated purpose in which the valve or flow-controlling elements will be disposed out of the way of the drinking animals and protected against an accumulation of dust or other foreign matter and also against chance blows which might damage the same. The invention is illustrated in the accompanying drawing and consists in certain novel features which will be hereinafter first fully described and then more particularly defined in the appended claim.

In the drawing:

Figure 1 is a plan view of a watering trough embodying the invention, and

Fig. 2 is a central longitudinal vertical section of the same.

The trough comprises an open top body 1 which is preferably rectangular and may be constructed of any convenient materials and lined if desired so that a structure which will be free of leakage and will be adapted to contain a supply of water will be cheaply provided. Near the opposite ends of the body are transverse partitions 2 which extend entirely across the body and terminate short of the bottom thereof, as shown at 3, whereby passages for the water will be provided below the partitions to permit the water to reach the spaces between the partitions and the respectively adjacent end walls of the body where it will be accessible to the stock, as will be understood upon reference to the drawing. A lever 4 is hinged, as shown at 5, to the upper edge of one partition 2 and extends therefrom longitudinally of the body but terminates adjacent the other partition. Below the lever 4 is a stop and guide member 6 which is disposed parallel with the partition 2 nearer the free end of the lever and preferably extends entirely across the body of the trough, as will be understood, a float 7 of any approved form being disposed between the guide 6 and the adjacent partition, as shown in Fig. 2. The float should be of such dimensions as to fit easily between the guide and the partition but large enough to be held by and between the same. The guide also forms a stop or rest for the free end of the lever, as will be readily understood upon reference to Fig. 2, and upon the upper side of the lever, preferably at about the center of the same, is a valve 8 which is in the form of an elastic or compressible disk of rubber, leather or similar material and is adapted to seat against the open end 9 of a supply pipe 10 which leads from any convenient source of supply.

When the water in the trough is low, the float 7 will, of course, be below the top of the guide 6 and the lever 4 will, consequently, drop down to the guide, as shown in Fig. 2, so that the water in the pipe 10 may escape through the open end 9 of the same and pass around the lever into the body of the trough to fill the same. As the level of the water in the trough rises, the float, of course, will be raised and eventually will impinge against the under side of the lever, whereupon as the flow continues and the water rises, the lever will be swung up against the end of the supply pipe and the valve 8 will be seated closely against the same to cut off the flow.

A cover 11 is secured to the upper edges of the partitions 2 and extends between the same over the lever and the valve so that these parts will be completely protected against any accumulation of dirt or other foreign matter and also against chance blows. It will be noted that the sides of the trough body are extended vertically, as shown at 12, to fit close against the under side of the cover 11 and the cover is reinforced centrally by a cross bar 13 to support the end of the supply pipe without distortion.

The device is exceedingly simple in the construction and arrangement of its parts and may be manufactured and installed at a very low cost. By its use, a constant supply of fresh water will be maintained for the benefit of the stock and inasmuch as the spaces between the ends of the trough and the partitions are open at the top, the water will be accessible at all times.

Having thus described the invention, I claim:

A watering trough comprising an open top body, transverse partitions in the body in spaced relation to the ends of the same whereby to provide drinking spaces, the partitions extending from the top of the body to points near the bottom of the same but spaced from the bottom, a supply pipe supported between the partitions to deliver water into the body, a lever hinged at the top of one partition and extending therefrom toward the other partition, a valve on the upper side of the lever arranged to seat against the end of the supply pipe to cut off the flow therefrom, a stop guide within the body adjacent one partition and below the free end of the lever whereby to form a rest for the lever, and a free float disposed between the stop guide and the adjacent partition to play between and be guided by the same and adapted to impinge against the free end of the lever as the level of the water rises whereby to seat the valve against the end of the supply pipe.

In testimony whereof I affix my signature.

CORNELIUS KRAAYENBRINK.